Dec. 20, 1960  W. O. KEEPING  2,964,916
PRODUCTION OF INERT ATMOSPHERES IN STORAGE
VESSELS, FUEL TANKS AND THE LIKE
Filed Oct. 10, 1958
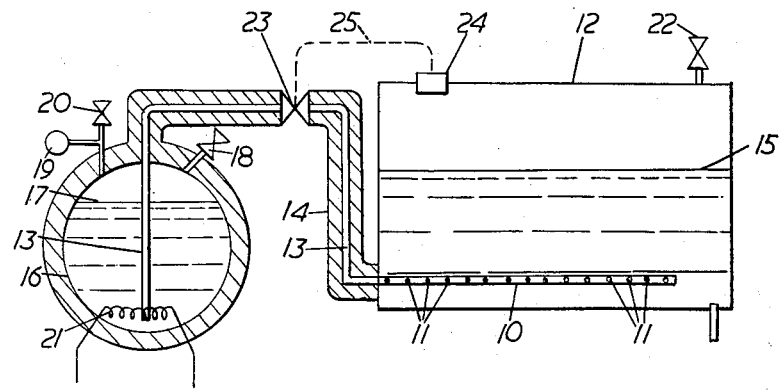
Inventor
WILLIAM OWEN KEEPING
By
*Aaron R. Townshend* Attorney

United States Patent Office 2,964,916
Patented Dec. 20, 1960

2,964,916

PRODUCTION OF INERT ATMOSPHERES IN STORAGE VESSELS, FUEL TANKS AND THE LIKE

William Owen Keeping, Selsdon, South Croydon, England, assignor to The British Oxygen Company Limited, a British company Filed Oct. 10, 1958, Ser. No. 766,523

Claims priority, application Great Britain Oct. 14, 1957

6 Claims. (Cl. 62—48)

This invention relates to the production of inert atmospheres in storage vessels containing potentially dangerous liquids such as petroleum products, liquid alkali metals, molten titanium and the like. The invention can be used for example for the pressurising of aircraft fuel tanks with inert gases, both to prevent fire or explosion and to maintain an excess pressure in a tank relative to ambient pressure as a safeguard against collapse of the tank.

It is already known to supply inert gas to an aircraft fuel tank by injecting a suppressant charge under the control of a light-sensitive or pressure-sensitive device, or by supplying inert gas continuously from gas storage cylinders, or by storing inert gas in the liquid phase, evaporating it, and feeding it to the tank.

The disadvantage of the first system is that the suppressant charge must be renewed before the system is again operative, and the two latter systems involve weighty apparatus which is undesirable in aircraft installations where weight and space economy is important.

According to the present invention liquefied inert gas is fed into potentially dangerous liquid in a storage vessel in a finely divided state and in widespread dispersal in the liquid, evaporation of the liquefied gas being effected by heat exchange between the liquefied gas and the liquid to produce an inert atmosphere within the vessel.

The liquefied gas may be injected directly into the stored liquid through an atomising device in the form of elongated tubular injection member which is immersed in the liquid and is provided with multiple small outlets throughout its length, and atomisation of the liquefied gas issuing from said outlets may be effected by feeding the liquefied gas at a pressure which is high enough to cause atomisation at the outlets without the requirement for special nozzles.

The pressure feeding of the liquified gas may be effected by controlled vaporisation of some of the liquefied gas in an insulated gas storage container connected to the atomising device, and the rate of injection of the liquefied gas into the potentially dangerous liquid may be controlled in response to a drop in a predetermined minimum pressure differential of the internal pressure of the storage vessel over the ambient pressure.

An embodiment of the invention will now be described with reference to the accompanying drawing, which is a diagram illustrating the application of the invention to the fuel tank of an aircraft.

Referring to the drawing, an atomising device in the form of an elongated injection member 10 having multiple small outlets 11 (e.g. a perforated tube) is located in the base of an aircraft fuel tank 12 so as to be normally immersed in the fuel 15, and a supply conduit 13 protected by insulation 14 extends therefrom to the interior of an insulated vessel 16 containing liquefied inert gas 17 (e.g. nitrogen), the inlet end of the conduit 13 being located adjacent the base of the vessel 16 so that it is below the surface of the liquefied gas 17 under normal conditions. The vessel 16 is provided with a filling opening 18, a pressure gauge 19 and a relief valve 20, the rating of the latter being such as to maintain a fairly high pressure within the vessel 16 (e.g. 130–150 p.s.i.) due to vaporisation of the liquefied gas 17. Such vaporisation can be produced either by natural influx of ambient heat to the vessel 16, or preferably by an internal direct electric heater indicated at 21, or by heating applied by an internal coil passing hot fluid medium.

It has been found that with this fairly high pressure feed of the liquefied gas to the injection member 10 immersed in the fuel 15, the member 10 can be a simple pipe with plain perforations 11 along its length, a fine degree of atomisation being achieved at the perforations 11 as a result of the instantaneous evaporation of part of the liquefied gas leaving the perforations upon the sudden reduction of pressure prevailing in the liquefied gas.

The cooling of the fuel 15 in the tank 12 due to evaporation of the liquefied gas by heat exchange with the fuel is so small as to be insignificant, and excessive local cooling is avoided by the elongated form of the atomising device 10 which provides widespread dispersal of the liquefied gas in the fuel.

The fuel tank 12 is provided with a relief valve 22 for venting it to prevent the pressure differential of the tank over the ambient pressure from exceeding a predetermined value. Venting will normally occur only during a climb.

A flow control valve is indicated at 23 in the liquid gas supply conduit 13 and is operated automatically by a pressure-responsive device, indicated at 24, associated with the fuel tank 12. The pressure-responsive device 24 operates when the pressure differential of the pressure within the fuel tank 12 over the ambient pressure falls below a pre-determined value, to open the flow control valve 23 by means of the operative connection indicated at 25 and allow feed of liquefied gas to the fuel tank to occur. The internal pressure of the fuel tank is thereby automatically maintained at a desired value above the ambient pressure, whatever the absolute value of the latter may be, so that the ingress of atmospheric air to the tank is positively prevented and the tank is always pressurised against collapse irrespective of altitude variations.

It will be appreciated that while an embodiment of the invention as applied to aircraft fuel tanks has been described, the invention is not limited to such use and other inert gases can be employed instead of nitrogen, the choice of gas depending on the nature of the potentially dangerous liquid.

The valves and pressure-responsive device abovementioned are not described in detail and are indicated symbolically in the diagram, since their construction forms no part of the present invention and they are mechanisms well-known in the pressure-fluid art.

The economy of apparatus achieved with the present invention renders its application to airborne installations important in view of the saving in weight and space which results, and in the matter of space economy it may even be found advantageous to locate the liquefied gas container actually within the fuel tank without serious effect on the fuel-carrying capacity of the tank.

What I claim is:

1. In the art of producing a safe atmosphere in a storage vessel containing a potentially dangerous liquid by the known process of maintaining all space in said vessel unoccupied by liquid filled with an inert gas, the improved process for the long-term maintenance of an inert gas atmosphere in a storage vessel which comprises the steps of establishing a stored supply of liquefied inert gas under heat-insulated conditions in the vicinity of the storage vessel, feeding said liquefied inert gas, while maintaining it under heat-insulated conditions into the potentially dangerous liquid in a finely divided state and in widespread dispersal in the liquid to avoid local supercooling thereof, and evaporating said liquefied gas by heat exchange with the potentially dangerous liquid to provide and maintain an inert gas atmosphere in said vessel.

2. In the art of producing a safe atmosphere in a storage vessel containing a potentially dangerous liquid by the known process of maintaining all space in said vessel unoccupied by liquid filled with an inert gas, the improved process for the long-term maintenance of an inert gas atmosphere in a storage vessel which comprises the steps of establishing a stored pressurised supply of liquefied inert gas under heat-insulated conditions in the vicinity of the storage vessel, feeding the liquefied inert gas, while maintaining it under heat-insulated conditions under pressure and in submersion into the potentially dangerous liquid, and in a finely divided state and in widespread dispersal in said liquid for avoiding local supercooling thereof, and evaporating said liquefied gas by direct heat exchange with the liquid to provide and maintain a pressurised inert gas atmosphere in said vessel.

3. In the art of producing a safe atmosphere in a storage vessel containing a potentially dangerous liquid by the known process of maintaining all space in said vessel unoccupied by liquid filled with an inert gas, the improved process for the long-term maintenance of an inert gas atmosphere in a storage vessel which comprises the steps of establishing a pressurised supply store of liquefied inert gas under heat-insulated conditions in the vicinity of the storage vessel, feeding the liquefied inert gas, while maintaining it under heat-insulated conditions under pressure and in submersion into the potentially dangerous liquid, and in a finely divided state and in widespread dispersal in said liquid for avoiding local supercooling thereof, evaporating said liquefied gas by direct heat exchange with the liquid to provide and maintain an inert gas atmosphere in said vessel, and metering the feeding of the liquified inert gas into the liquid in dependence upon the pressure of said inert gas atmosphere and at a rate to maintain a predetermined minimum pressure differential between the pressure of said inert atmosphere and ambient pressure.

4. Apparatus for producing a safe atmosphere in a storage vessel for potentially dangerous liquid, comprising the combination with said storage vessel of a body of potentially dangerous liquid in said vessel, a thermally-insulated pressure vessel, a body of pressurised liquefied inert gas in said pressure vessel, a liquid-atomising device located in the base of said storage vessel so as to be submerged in the body of potentially dangerous liquid, and thermally-insulated conduit means connecting the pressure vessel with the atomising device for the supply of liquefied inert gas under pressure to the atomising device, said device being formed to effect fine division and widespread dispersal of the liquefied inert gas within the body of potentially dangerous liquid.

5. Apparatus for producing a safe atmosphere in a storage vessel for potentially dangerous liquid, comprising the combination with said storage vessel of a body of potentially dangerous liquid in said vessel, a thermally-insulated pressure vessel, a body of pressurised liquefied inert gas in said pressure vessel, a liquid-atomising device located in the base of said storage vessel so as to be submerged in the body of potentially dangerous liquid, thermally-insulated conduit means connecting the pressure vessel with the atomising device for the supply of liquified gas under pressure to the atomising device, a relief valve on the storage vessel for venting the latter when a predetermined maximum pressure is attained therein, a flow-control valve in said conduit means, a pressure-responsive device on the storage vessel which is sensitive to the pressure differential between ambient pressure and the internal pressure of the storage vessel, and an operative connection between said pressure-responsive device and the flow-control valve, whereby the feed of liquefied inert gas to the atomising device is metered to maintain said pressure differential at a predetermined minimum value, said atomising device being formed to affect fine division and widespread dispersal of the liquefied inert gas within the body of potentially dangerous liquid.

6. Apparatus for producing a safe atmosphere in a storage vessel for potentially dangerous liquid, comprising the combination with said storage vessel of a body of potentially dangerous liquid in said vessel a thermally-insulated pressure vessel, a body of pressurised liquefied inert gas in said pressure vessel, a tubular elongated member having multiple small perforations therein located in the base of said storage vessel so as to be submerged in the body of potentially dangerous liquid, thermally-insulated conduit means connecting the pressure vessel with said member for the supply thereto of liquefied gas under pressure, a relief valve for venting the storage vessel when a predetermined maximum pressure is attained therein, a flow-control valve in said conduit means, a pressure-responsive device which is sensitive to the pressure differential between ambient pressure and the internal pressure of the storage vessel, and an operative connection between said pressure-responsive device and the flow control valve, whereby the feed of liquefied inert gas to the tubular elongated member is metered to maintain said pressure differential at a predetermined minimum value.

References Cited in the file of this patent

UNITED STATES PATENTS

| | | |
|---|---|---|
| 2,341,268 | Davis | Feb. 8, 1944 |
| 2,440,930 | Camilli et al. | May 4, 1948 |
| 2,525,597 | Frazey | Oct. 10, 1950 |
| 2,650,478 | Brown | Sept. 1, 1953 |
| 2,764,873 | Mooyart | Oct. 2, 1956 |
| 2,908,145 | Haumann | Oct. 13, 1959 |
| 2,916,889 | Sattler | Dec. 15, 1959 |